United States Patent
Peltz

(10) Patent No.: US 9,579,698 B2
(45) Date of Patent: Feb. 28, 2017

(54) METHOD FOR DECONTAMINATION WITH DECONTAMINANTS

(71) Applicant: The Boeing Company, Chicago, IL (US)

(72) Inventor: Leora Peltz, Pasadena, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/099,949

(22) Filed: Apr. 15, 2016

(65) Prior Publication Data

US 2016/0303623 A1    Oct. 20, 2016

Related U.S. Application Data

(62) Division of application No. 13/693,562, filed on Dec. 4, 2012, now Pat. No. 9,339,853.

(51) Int. Cl.
| | |
|---|---|
| *A62D 3/38* | (2007.01) |
| *B08B 17/02* | (2006.01) |
| *B08B 7/00* | (2006.01) |
| *B08B 3/08* | (2006.01) |
| *B08B 3/10* | (2006.01) |
| *B64F 5/00* | (2006.01) |
| *B60S 3/00* | (2006.01) |
| *B60S 3/04* | (2006.01) |

(52) U.S. Cl.
CPC ............ *B08B 17/02* (2013.01); *B08B 3/08* (2013.01); *B08B 3/10* (2013.01); *B08B 7/0057* (2013.01); *B60S 3/008* (2013.01); *B60S 3/04* (2013.01); *B64F 5/0018* (2013.01)

(58) Field of Classification Search
CPC ....................................... A62D 3/38

USPC .......................................... 588/320
See application file for complete search history.

(56) References Cited

U.S. PATENT DOCUMENTS

| | | |
|---|---|---|
| 2006/0207629 A1 | 9/2006 | Rastegar et al. |
| 2012/0276334 A1 | 11/2012 | Fedynyshyn et al. |

FOREIGN PATENT DOCUMENTS

| | | |
|---|---|---|
| DE | 102009058962 A1 | 5/2011 |
| EP | 0718872 A1 | 6/1996 |
| WO | 2010096073 A1 | 8/2010 |

OTHER PUBLICATIONS

Deval, Joanne, et al., Reconfigurable hydrophobichydrophilic surfacesin microelectromechanical systems (MEMS), J. Micromech. Microeng. 14 (2004) 91-95.
Verplanck, Nicolas, et al., Wettability Switching Techniques on Superhydrophobic Surfaces, Nanoscale Res Lett (2007) 2:577-596.
European Patent Office, International Application No. PCT/US2013/062705 International Search Report and Written Opinion dated Jan. 23, 2014, pp. 1-13.
The Boeing Company; International Preliminary Report on Patentability for International Application No. PCT/US2013/062705 dated Jun. 9, 2015, 9 Pages.

*Primary Examiner* — Edward Johnson
(74) *Attorney, Agent, or Firm* — Christopher J. Knors; Moore & Van Allen PLLC

(57) ABSTRACT

Reversibly switchable (transformable) surface layer changeable from (super)hydrophobic to (super)hydrophilic surface states are described. Methods of decontamination of surfaces exposed to contaminate are provided. The reversibly switchable properties of the surface layer can be controlled by an external stimulus.

18 Claims, 5 Drawing Sheets

METHOD FOR DECONTAMINATION WITH DECONTAMINANTS

CROSS-REFERENCE TO RELATED APPLICATIONS

This application is a divisional of U.S. Nonprovisional application Ser. No. 13/693,562, now U.S. Pat. No. 9,339,853, entitled SURFACE MATERIALS FOR DECONTAMINATION WITH DECONTAMINANTS, filed Dec. 4, 2012, the entire contents of which is being incorporated by reference herein.

TECHNICAL FIELD

This disclosure relates to decontamination methods and surfaces configured for decontamination, and in particular to methods of and materials for using a surface adjustable upon application of an external stimulus.

BACKGROUND

Decontamination of biological and/or chemical agents is necessary in current environments. Biological decontamination is the deactivation and/or destruction of microorganisms, and pathogens, such as bacteria, both vegetative and sporulative, bacterial spores, viruses, mycoplasma, protozoans, oocysts, and toxins. Chemical decontamination is the deactivation and/or destruction of chemical contaminants, pesticides, chemical warefare agents, and other toxic substances. Some conventional methods of decontamination, of surfaces, which may also include disinfecting agents, include chemical washing, fumigation, heat treatment, and irradiation. Chemical washing includes washing the surface with simple soap and water, bleach, DS-2, hydrogen peroxide, alkali, hexachlorophene, quaternary amines, and the like. Fumigation includes exposing an object or its surface to a fumigant for a time sufficient to deactivate or destroy the biological/chemical agent. Heat and irradiation treatments involve providing temperatures or amounts of radiation, respectfully, that is fatal to the biologic or sufficient to decompose or alter the chemical substance to one that is not harmful.

In certain situations, it may be necessary to decontaminate a vehicle, for example, an aerospace vehicle, which has been contaminated for one or more reasons. "Contaminated" interior aircraft surfaces are typically decontaminated by application of fluid decontaminants. The methods for applying the liquid decontaminant include hand-wiping, or controlled application using sprayers, or injectors, nebulizers or atomizers. In each of these processes there is an implicit trade-off between (i) creating a decontaminating fluid layer that covers the affected surface well and also penetrates into grooves and crevices (e.g., surfaces having complex geometries); and (ii) removing completely the decontaminating fluid and biological/chemical agent from the surfaces and crevices, while minimizing and/or preventing surface damage and corrosion to the aerospace vehicle. Conventional washing methods and aerosolized decontamination use surfactants that may reduce the surface tension of surfaces, however such methods delay the removal of fluid and/or may leave residues. Likewise, fumigation methods often result in non-uniform coverage, with the decontaminating agents depositing in coalesced droplets, rather than in a fluid film, resulting in reduced deactivation or destruction of the biological/chemical agent and/or overall reduced efficacy of the decontamination process. Known chemical agent resistant surfaces and/or coatings typically require application of caustic oxidizing solutions to remove any chemical or biological agents or contaminants. Such caustic oxidizing solutions, such as DS2 (Decontamination Solution Number 2), which comprises 70% diethylenetriamine, 28% ethylene glycol monomethyl ether, and 2% sodium hydroxide, can cause damage to surfaces and surroundings to which it is applied. Moreover, having to transport such additional caustic oxidizing solutions to the location of the contaminated aircraft, rotorcraft, vehicle, or equipment can be expensive and time consuming. In addition, having to apply such additional caustic oxidizing solutions can be time consuming and labor intensive, and the down time of the aircraft, rotorcraft, vehicle, or equipment can be increased.

SUMMARY

In a first embodiment, a method for decontaminating a surface is provided. The method comprising: providing a surface susceptible to contamination, the surface having a first hydrophobic surface state and a second hydrophilic surface state, wherein the first surface state and the second surface state are reversibly transitionable by application of an external stimulus; optionally, introducing a decontaminating agent to the contaminated surface; and transitioning at least a portion of surface such that the decontaminating agent wets at least a portion of the surface. In one aspect, at least a portion of the surface of the substrate is decontaminated.

In a first aspect, the method further comprises removing at least a portion of the decontaminating agent from the surface.

In another aspect, alone or in combination with the first aspect, the stimulus is electrical, light, chemical, mechanical, or combinations thereof.

In another aspect, alone or in combination with any one of the previous aspects, the decontaminating agent substantially wets the hydrophilic surface.

In another aspect, alone or in combination with any one of the previous aspects, the hydrophobic surface is superhydrophobic.

In another aspect, alone or in combination with any one of the previous aspects, the hydrophilic surface is superhydrophilic.

In another aspect, alone or in combination with any one of the previous aspects, the hydrophilic surface facilitates liquid film formation of the one or more decontaminating agents.

In another aspect, alone or in combination with any one of the previous aspects, the method further comprises removing at least a portion of the one or more contaminates.

In another aspect, alone or in combination with any one of the previous aspects, the substrate is at least an interior surface of a vehicle or the exterior surface of equipment.

In another aspect, alone or in combination with any one of the previous aspects, the substrate is at least an interior surface of an aerospace vehicle.

In a second embodiment, an apparatus is provided. The apparatus comprises: at least one reversible surface, reversible by application of an external stimulus from a first surface state to a second surface state, wherein: (i) the first state presents a substantially hydrophobic surface and the second state presents a substantially hydrophobic surface; or (ii) the first state presents a substantially hydrophobic surface and second state a substantially hydrophilic surface wherein the first surface state is at least partially restored upon removal of the external stimulus.

In a first aspect, the at least one reversibly surface comprises a semiconductor oxide or chemically modified polymer.

In another aspect, alone or in combination with the first aspect, the surface is at least a portion of the interior of an aerospace vehicle.

In a third embodiment, a method for decontaminating a surface is provided. The method comprises providing a surface susceptible to contamination, the surface having a first surface state and a second surface state, wherein the first surface state and the second surface state are reversible by application of an external stimulus; wherein either (i) the first surface state presents a substantially hydrophobic surface and the second surface state presents a substantially hydrophilic surface; or (ii) the first surface state presents a substantially hydrophilic surface and second surface state presents a substantially hydrophobic surface; introducing a decontaminating agent to the surface; and adjusting at least a portion of the first surface state to the second surface state, wherein the decontaminating agent wets at least a portion of the surface.

In a first aspect, the method further comprises discontinuing the external stimulus, wherein at least a portion of the second surface state is reversed back to the first surface state.

In another aspect, alone or in combination with the first aspect, the second surface state facilitates wetting of at least a portion of the surface layer by the decontaminating agent.

In another aspect, alone or in combination with any of the previous aspects, the wetting of the surface layer facilitates decontamination of the surface.

In another aspect, alone or in combination with any of the previous aspects, the surface comprises semiconductor oxides or chemically modified polymer.

In another aspect, alone or in combination with any of the previous aspects, at least a portion of the hydrophobic surface state is a superhydrophobic surface.

In another aspect, alone or in combination with any of the previous aspects, at least a portion of the hydrophilic surface state is a superhydrophilic surface.

In another aspect, the method further comprising removing at least a portion of the contamination from the contaminated surface.

DETAILED DESCRIPTION

Figure 1:
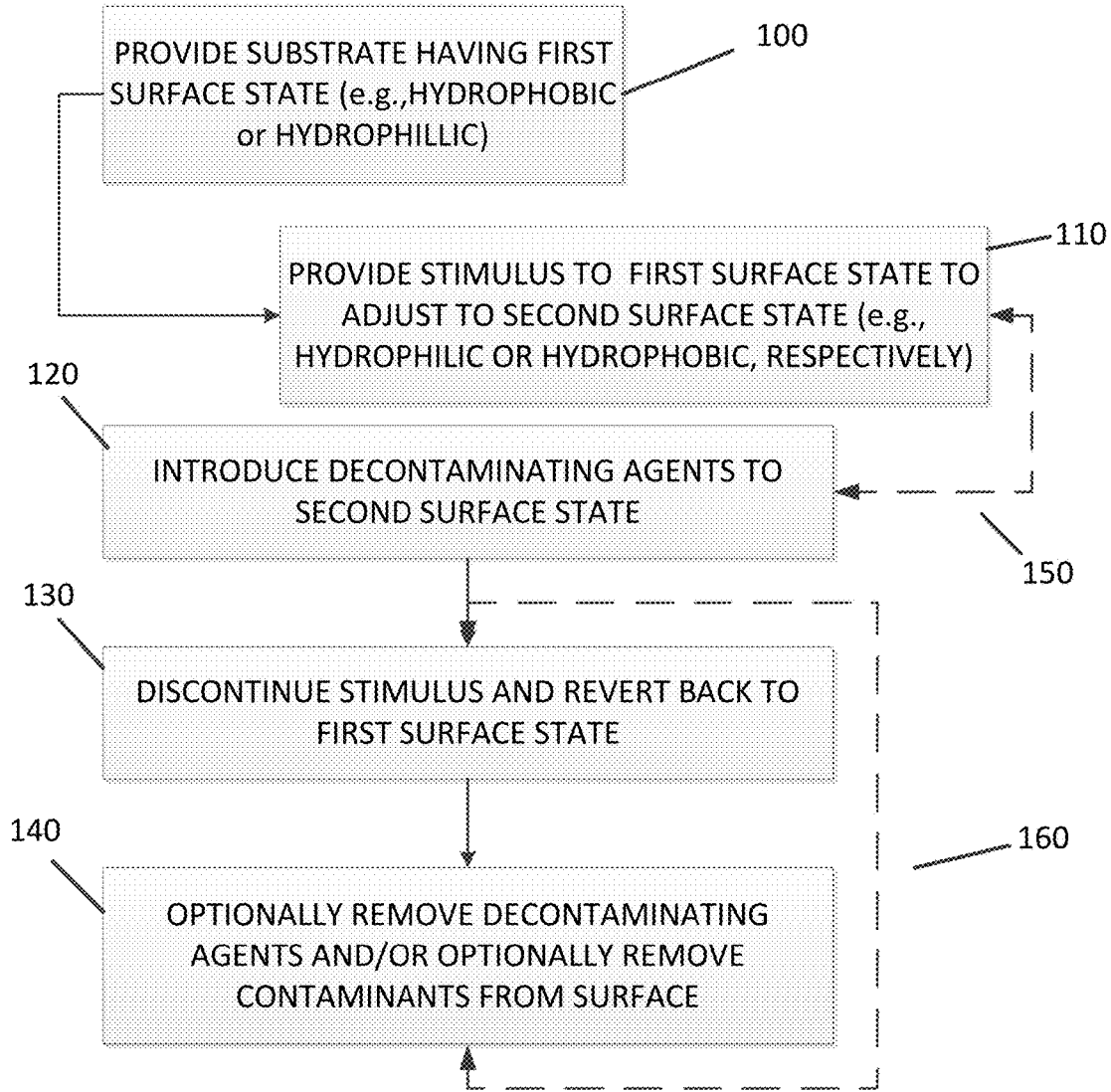
FIG. 1 depicts a flow chart of an exemplary method disclosed herein.

The present disclosure related to reversibly adjustable, or transformable, materials for protecting against contamination and/or enabling effective decontamination dynamically with application of an external stimulus. Such surfaces or surface-adjustable coatings can be used on equipment existing or interiors of vehicles. Such surfaces or coatings preferably maintain their adjustability in severe wear-intensive environments. Such adjustable coatings can be applied on top of a painted surface, a fabric, or other surface used on or in vehicles, or equipment. Such surfaces or coatings reduce the amount of chemical (decontaminating agents) required and/or shorten the return-to-service time to decontaminate the equipment or vehicle. Such surfaces and coatings are adapted for use with conventional hazmat and decontamination techniques and can be readily incorporated with such methods.

The process and materials disclosed herein are is particularly suited for the decontamination of surfaces pertaining to equipment, and occupiable volumes or spaces in need thereof as a result of a contamination event.

(Super)Hydrophobic and (Super)Hydrophillic Surfaces

The terms "hydrophobic" and "hydrophilic," in relationship to surfaces, have their ordinary and customary meaning as used herein. Superhydrophobic surfaces are highly hydrophobic, i.e., extremely difficult to wet. For example, the contact angle of a water droplet on a superhydrophobic surface exceeds 150° and the roll-off angle is less than 10°.

Superhydrophilic surfaces are characterized as providing extremely low contact angle between water and the surface. The contact angle of water with generally hydrophilic inorganic materials, such as glass, is generally 20-40 degrees, whereas the contact angle of water with typical hydrophilic organic materials, such as resins, is 70-90 degrees, and the contact angle of water with hydrophobic resins, such as silicone resin and fluorocarbon polymers, is more than 90 degrees. By way of comparison, the contact angle of superhydrophilic surfaces is less than 20 degrees, less than 10 degrees, or less than 5 degrees. In some aspects, a superhydrophilic surface can cause the water contact angle to approach zero.

Contact angle is a measure of static hydrophobicity, and contact angle hysteresis and slide angle are dynamic measures useful for determining the state of the surface of the disclosed embodiments. Contact angle hysteresis is a phenomenon that characterizes surface heterogeneity. Differences between advancing and receding contact angles, termed contact angle hysteresis, can be used to characterize surface heterogeneity, roughness, and mobility. Surfaces that are not homogeneous will have domains which impede motion of the contact line. The slide angle is another dynamic measure of hydrophobicity and is measured by depositing a droplet on a surface and tilting the surface until the droplet begins to slide.

The present method provides, in one aspect, an adjustable substrate surface having a first hydrophobic surface state that transitions to a second hydrophilic surface state promoting uniform coverage with a fluid film comprising one or more water-based decontaminant, which maximizes decontamination of the substrate. After decontamination, the substrate surface state can be transitioned back to the first hydrophobic surface state that promotes aggregation of the fluid into droplets that can be removed easier.

The effect of hydrophobic/hydrophilic transitional properties of the surface is beneficial for the decontaminating agent such as where for water-based decontaminant fluids, the second hydrophilic surface state promotes essentially a uniform coverage with a fluid film (e.g., wetting), which enhances decontamination, and the first hydrophobic surface state promotes aggregation of fluid into droplets that can be removed easier, since they will coalesce and/or tend to roll off the surface. In another aspect of the present method, an adjustable substrate surface having a first hydrophilic surface state that transitions to a second hydrophobic surface state is beneficial for utilization of one or more emulsion-type decontaminant that is at least partially hydrophobic, and thus, the one or more emulsion-type decontaminates will form a film on the second hydrophobic surface, and upon transition back to the first hydrophilic surface state provide for removal of the emulsion-type decontaminate.

Adjustable surfaces switching reversibly between hydrophobic and hydrophobic surface states can be effectively fabricated by utilizing stimuli-responsive materials. Such surfaces in combination with decontaminating agents provide a method of decontaminating vehicles and/or equipment. The surfaces can be prepared with materials added to engineering materials used to fabricate the vehicle or equipment or can be coated on existing interiors and/or surfaces of the vehicle or equipment. In one aspect, adjustable surfaces switching reversibly between super-hydrophobic and super-hydrophilic surface states can be employed. The surface states can be adjusted by the application of an external stimulus, whereas discontinuation or modulation of the external stimulus reversibly adjusts the surface of the substrate between the first state and second state. The external stimulus can be directed to the materials directly or the interior they are coated on. In this manner, the decontamination can be more efficient, as the surface contaminate is more effectively presented to the decontaminating agents and or more easily removed from the contaminated surfaces. Moreover, contamination that has entered small crevices or surface defects is more efficiently presented to the decontaminating agents upon adjustment of the substrate surface from a first hydrophobic surface state to a second hydrophilic state.

The externally applied stimulus can includes one or more of light irradiation, electrical potential, temperature, pH or selected solvents, and/or mechanical forces. Such adjustable surfaces include controllable, wettable surfaces that are configured to receive and/or interact with decontaminating agents and other compounds effective in decontamination.

Materials and Methods of Adjusting Surface States

Examples of adjustable materials for the methods disclosed herein include, for example, photo-responsive materials, include inorganic semiconductor oxides such as titania, zinc oxide, vanadium oxide, etc. These materials are normally hydrophobic in a first state, and can be modified, e.g., by texturing to a submicron roughness, to provide a first superhydrophobic surface state. Exposure of the semiconductor oxide surfaces to UV light provides for an adjustment or transition of the surface to a second hydrophilic surface state, which if modified by submicron roughness can provide essentially complete wetting of aqueous media alone or in combination with decontaminating agents. Storage of the second hydrophilic state in the dark for a sufficient time interval provides for reversibility from the second state to the first state.

The adjustable materials or coatings can include one or more of oxides of titanium, oxides of zinc, oxides of iron, oxides of silver, oxides of copper, oxides of tungsten, oxides of tin, oxides of bismuth, strontium titanate and mixtures thereof. The oxides in the adjustable materials or coatings can include sub-oxides, stoichiometric oxides, and super-oxides. In embodiments, the ultraviolet radiation activated layer includes one or more of $TiO_2$, $ZnO$, $Fe_2O_3$, $WO_3$, $SnO_2$, $Bi_2O_3$, $V_2O_5$, and $SrTiO_3$. The oxides can be used in a form that is suitable for incorporation into materials to affect the surface thereof, or used in coatings. The oxides can be of a size suitable for such applications, including micron particles, submicron particles, nanoparticles, and physical mixtures and/or distributions thereof. Preferably, the adjustable materials or coatings include titanium oxide or vanadium oxides. Preferably, the titanium oxide includes $TiO_2$. The titanium oxide can include amorphous, rutile and anatase phases of titanium oxide, or a mixture of two or more of these phases.

The inorganic semiconductor oxides can be added to materials normally used in the fabrication or construction of vehicles or equipment, especially interiors of vehicles. Preferably, the inorganic semiconductor oxides are more concentrated at the surface, which can be provided by molding techniques or post-fabrication annealing. Alternatively, the inorganic semiconductor oxides can be deposited on existing surfaces of the vehicles or equipment, for example, by sputter coating, thermal spraying, or other coating techniques.

Additional compounds, either as additives, surface graphs, or coatings can be used alone or in combination with the above inorganic semiconductor oxides. Such additional compounds can be organic or substantially organic, for example, azobenzene and spiropyran functional groups, capable of switching between polar forms in response to light and switching back to a nonpolar form after a predetermined time in the dark.

In another aspect, adjustable materials or coatings useful for practicing the methods herein disclosed can be reversibly electrically induced between different surface states. Such adjustable materials or coatings include conducting polymers, for example, a positively charged conjugated (alternating single and double bond) backbone polymer in combination with negatively charged dopants. The hydrophobicity/hydrophilicity can be controlled by the selection of conducting polymer and type of dopant and the dopant concentration. In one example, polypyrrole (PPy) films on submicron roughened surfaces can be adjusted from a (super)hydrophobic to (super)hydrophilic state by adjusting the applied voltage to the adjustable material or coating, or the grounded vehicle or equipment.

In yet another aspect, adjustable surface can be reversed by application of an amount of heat or thermal radiation sufficient to effect the transition of the first hydrophobic surface state to the second hydrophilic surface state. Exemplary adjustable materials or coatings that can be reversibly thermally adjusted between a first hydrophobic surface state and a second hydrophilic surface state include polymeric systems and surface coatings. For example, chemically modified poly(N-isopropylacrylamide) combined with surface roughness, has excellent reversibility between a first hydrophobic state at about at 20° C. and a second hydrophilic state at about 40° C., respectively. In some aspects, reversibility between a hydrophobic surface and a hydrophilic surface can, in part, be manipulated by the roughness of the surface. For example, the roughness-enhanced thermally responsive wettability of a poly(N-isopropylacrylamide) (PNI-PAAm)-modified surface provides for reversible switching between a first superhydrophilic surface state and a second superhydrophobic surface state in a narrow temperature range of about 10° C. While not to be held to any particular theory, this transition is believed to result from the combined effect of the chemical variation of the surface and the surface roughness. Such surfaces may be prepared by surface-initiated atom-transfer radical polymerization to fabricate thermally responsive PNI-PAAm thin films, for example, on both flat and textured substrates.

In yet another aspect, exemplary surfaces and coatings useful in practicing the methods herein disclosed include materials that can adjust from a first hydrophobic surface state and a second hydrophilic surface state by way of geometric control of the surface and/or the introduction of stress to the surface. Thus, applying a mechanical stress to a micro/nanostructured surface effectuates a change the spacing and/or geometry of surface features, such as asperities in one or more physical dimensions. Roughness (projected area/actual area) can be adjusted to change one or more feature aspect ratios so as to control the nature of the hydrophobic/hydrophilic adjustment. For example, a first geometric-shaped hydrophobic surface state can be stimulated to change to a second geometric-shaped hydrophilic surface state under a stress. The stress can be uni-axial or biaxial relative to the surface of the substrate or coating. In one aspect, the coating or surface in a first unstretched state is hydrophobic or superhydrophobic and adjusts or transforms to a second stretched state that is hydrophilic or superhydrophilic when stretched. In one aspect, the polymer is a polyimide with a predetermined side chain configuration of predetermined length and/or chemical composition that allows wetting in the second the stretched-strained state by providing the wetting fluid access to a lower energy state as opposed to a higher energy state that forces or repels the wetting fluid in the (super)hydrophobic "Cassie" state.

The process disclosed herein is adaptable for treating chemical and/or biological contamination of a surface, such as a surface interior of a vehicle, such as an aerospace vehicle or other vehicle or equipment.

In one exemplary embodiment, a photo-adjustable material is used to exemplify the methods herein disclosed, for which substitution of the appropriate stimulus being readily undertaken by one of ordinary skill. Generally, a decontaminating agent is applied to the surface, preferably as an aerosol spray, whereby the surface having previously been or subsequently illuminated, preferably with ultraviolet light, with sufficient intensity (power per unit area) to effect adjustment of the surface from the first hydrophobic surface state to the second hydrophilic surface state to receive the decontamination agent. This decontamination can result from the photodecomposition of the chemical contaminants or alteration of critical biological molecules or structures of the pathogens, and/or result in chemical reaction with the products of photochemical reactions to effect the decontamination or deactivation. The surface state can be reversed back to one of hydrophobic or superhydrophobic to facilitate the removal of the contaminates, which can be viable or partially or completely deactivated.

Thus, in one example, an adjustable surface suitable for UV stimulation can be a semiconductor oxide, suitable for exposure of UV having a surface thickness on a substrate of from about 1 to about 250 nm, preferably from 14 to 20 nm, thick. UV activation can be accomplished by exposure to sunlight or UV radiation having a wavelength in a range of from 10 to 400 nm, e.g., from 300 to 400 nm. UV radiation having a wavelength of 350 to 400 nm can be used for adjusting materials or coating comprising, e.g., $TiO_2$. The ultraviolet radiation activated layer can generally be activated with a minimum dose of UV radiation in a range of from about 0.001 to 1 $mW/cm^2$. Other intensities can be used.

One or more decontaminating agent during the illumination of the adjustable surface while in or subsequent to the second hydrophilic state so that a sufficient quantity of decontaminating agent is available to contact the contaminants and/or pathogens. According to one aspect, the decontaminating agent(s) can be electrostatically charged (e.g., as it is sprayed as an aerosol) to promote the adherence of the agent to the surface to be treated. For conducting or semi-conducting targets, or dielectric targets that are backed by conductors or have conductors within their structure, the charged particles resulting from the electro-spraying will be attracted to, and adhere to, the surface to be treated.

In another exemplary embodiment, a thermally-adjustable material is used to exemplify the methods herein disclosed, for which a thermal system can be employed to raise the temperature of the substrate, which can be the interior surfaces of a contaminated vehicle or equipment. The thermal decontamination system is configured to deliver heated or cooled air under feed-back control from a self contained unit, which can be mobile, e.g., on a truck. The system is intended to deliver hot air of controlled humidity to achieve transition of the first hydrophobic surface state to the second hydrophilic surface state while decontaminating agents are introduced. Viral and/or chemical decontamination can also occur by heat exposure. The second hydrophilic surface state is then cooled so as to return to first hydrophobic surface for re-entry and/or use the vehicle or equipment.

Another example, which can be used in combination with any of the materials previously discussed, is a biomimetic surface includes a structure similar to that found in nature, comprising a surface-structured polymer, such as polycarbonate, polyamide or other engineering resins. The polymer comprises a micro/nano binary structure similar to a natural micro/nanostructure, e.g., that of a lotus leaf. These nanoscale features enhance the polymer surface's hydrophobicity, with or without the combination of the materials discussed above.

Decontaminating Agents

The decontaminating agent can be a fluid, a gas, or a solid dissolved or suspended in a fluid carrier. Decontaminating agent chemistry can be chosen based on its effectiveness for destruction/inactivation of the particular biological and chemical agents, preferably agents are safe to the components of the vehicle and/or equipment interior components, for example. As used herein, contacting the surface with a fluid or gas, the fluid or gas having one or more decontaminating agents effective against one or more contaminates is inclusive of any amount of destruction/inactivation of the particular biological and/or chemical agent, or the encapsulation of the particular biological and/or chemical agent for safe removal. Destruction includes the death of a biological agent or the biological alteration thereof to a non viral or non-toxic state or form. Inactivation includes chemical alteration of the chemical agent to a non-toxic or harmless compound.

Examples of suitable non-toxic decontaminants include peracids, such as peracetic acid, halogen solutions, halogen compounds and solutions of halogen compounds (e.g., sodium hypochlorite, chlorhexidine digluconate, cetyltrimethylammonium, -benzylammonium, and -diammonium halides, cetyltributyl-phosphonium halides, dodecyltrimethylammonium halides, tetradecyltrimethylammonium halides, and the like), phenolic compounds and halogenated phenolic compounds in solution (e.g., Triclosan), selenium sulfide, asiatic acid, benzoyl peroxide, minocyclin, and the like, alone or in combination. A peracetic acid solution, at a concentration of about 500 to about 5000 ppm optionally with surfactants to aid removal of the contamination, is suitable and is effective against a large number of chemical and biological pathogens. In addition to the decontaminating agent, sensitizers, e.g., photosensitizers, surfactants, wetting agents, etc., can be used.

Photosensitizers can be chosen based on a preferred microbicidal or chemical decontamination protocol, e.g., photooxidative, photocytotoxic or photodynamic reactions. For broad spectrum microbicidal effect, photooxidative photosensitive effects can be used. Suitable photosensitizers include mixtures of peroxy compounds, for example, peroxy compounds comprising an —OH or an —OOH group, including hydrogen peroxide, paracetic acid, hydrogen peroxide and paracetic acid, perpropioniac acid, propionic acid, and mixtures thereof. One suitable photosensitizer is an aqueous solution containing about 0.01% to about 1% peracetic acid sold as ZEROTOL© available from Bio-Safe System, Inc., or RENALIN© available from Minntech Corp.

A surfactant may be added to decontaminating agents to aid in the dispersion and coating of the surface in the second hydrophilic state. The selection of the surfactant depends upon the nature of the surface, the biological/chemical contaminant and/or its action as a wetting agent and its non-interference on the decontamination effect of the decontaminating. Suitable surfactants include non-ionic surfactants such as low carbon number alcohol ethoxylate, anionic surfactants, including alkyl sulfates and alkane sulfonates, and mixtures thereof. For example, alkyl sulfates and alkane sulfonates can be used. Various diluents can be added to adjust the viscosity or concentration of the decontaminating agents, or to stabilize the decontaminating agents. The selection of the diluent depends upon the environmental conditions and the delivery system. Suitable diluents include water and weaker acids. Wetting and dispersion on the surface of an object can be aided by use of a surfactant. Selection of surfactant depends on.

With reference to FIG. 1, a block diagram depicting in a general sense the disclosed method is provided. Thus, Step 100 provides a substrate having a first surface state, which can be hydrophobic or hydrophilic. Step 110 provide for the application of a stimulus to the adjustable surface, causing the first surface to transition, e.g., to hydrophilic or hydrophobic, (the "opposite") respectively, which can be sequential or simultaneous with Step 150, the introduction of the decontaminating agent to the particular adjusted surface state, as shown by dotted double arrow cycle 150, whereby the decontaminate, having hydrophobic or hydrophilic characteristics, can form a film on the second surface state. Cycling of steps 110 (including the stimulus) and 120 (including varying amounts of agent introduction) can be used as needed. After a time interval known or predetermined to provide decontamination of the contaminated surface, the application of stimulus is discontinued, terminated, or otherwise ended, as in Step 130. Termination of the stimulus reverts the second surface state back to the first surface state and facilitates the removal, e.g., by beading up, of the decontaminate and optionally, the contaminate. Steps 110, 120 and 130 can be cycled any number of times as needed. Step 140 depicts the optional removal of at least a portion of the decontaminating agents from the surface of the substrate, for example by wiping, vacuum, evaporating, etc., and/or at least a portion of the contaminates. Steps 110, 120, 130, and 140 can be cycled any number of times as needed. In one aspect, the substrate surface is designed for one cycle, for example, the adjustment from the first state to the second state, whereby the decontamination is completed and the substrate surface is replaced. In other aspects, the substrate surface is returned to normal or similar service.

Figure 2:
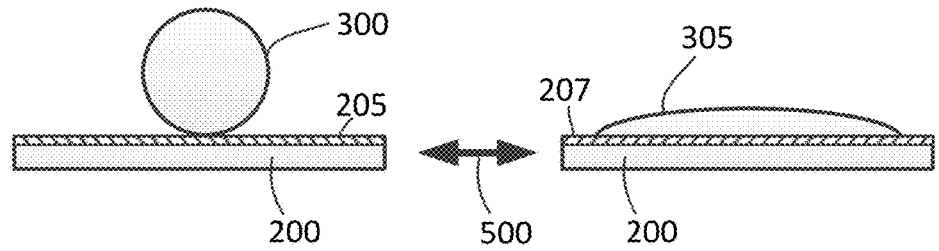
FIG. 2 illustrates the reversible wetting of an adjustable hydrophobic-hydrophilic surface.

FIG. 2 depicts in general the reversibility of the first and second surface states and the effect on wetting. Thus, substrate 200 having hydrophobic (or hydrophillic) surface 205, which is in the first state, displays characteristic beading of aqueous droplet 300. Adjustment or transformation by stimulus, indicated by arrow 500, provides altered second surface state 207, displaying characteristic wetting behavior of aqueous droplet 305. Removal of stimulus, which can be electrical, light energy, heat energy, or mechanical stress, causes reversal of essentially all or part of surface 207 to convert, transform, or adjust back to first hydrophobic (or hydrophilic) state, e.g., surface 205. While exemplary, FIG. 2 can be representative of a superhydrophobic-superhydrophilic surface state transition or adjustment.

Figure 3A:
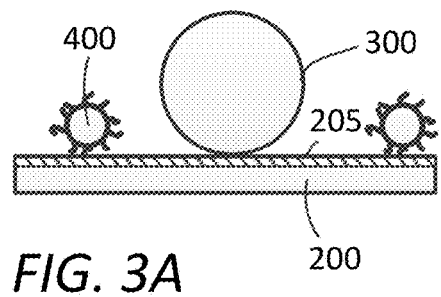
FIGS. 3A-3D depicts an exemplary embodiment of the materials and methods disclosed herein for decontamination of a surface.
Figure 3B:
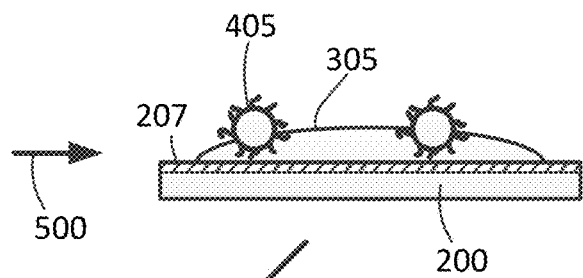
Figure 3C:
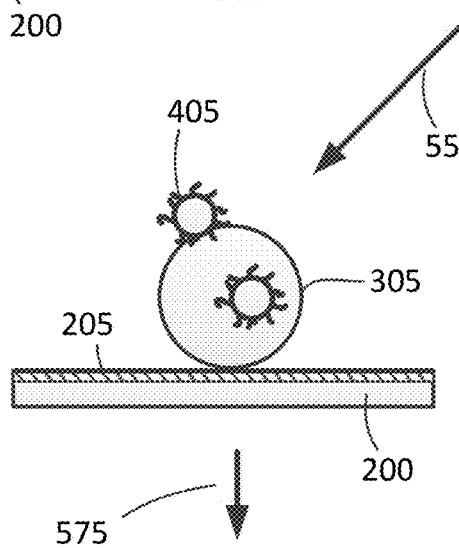
Figure 3D:
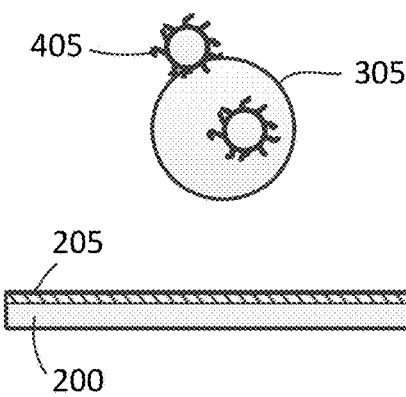

FIG. 3A depicts one embodiment of the method disclosed herein wherein a contaminated surface is decontaminated. Thus, substrate 200 having hydrophobic (or hydrophilic) surface 205, which is in the first date, further having contaminant 400 present thereon, is presented with decontaminating agent 300. FIG. 3B depicts adjustment or transition from the first hydrophobic (or hydrophilic) surface state to a second hydrophilic (or hydrophobic) surface state, depicted as surface 207, whereby decontaminating agent 300 has wetted surface 207 and contaminant 400 is either deactivated, chemically altered, or both as depicted by the generic "deactivated contaminant" 405. In one aspect, deactivated contaminant 405 may still be viable. FIGS. 3C-3D depict adjustment of the second hydrophilic (or hydrophobic) surface state back to the first hydrophobic (or hydrophilic) surface state (shown by arrow 550), whereby surface 205 causes decontaminating agent 305, which contains deactivated (or viable) contaminant 405, is presented for removal. In an alternate embodiment, contaminate 405 is left on the surface in a deactivated or detoxified state.

Figure 4:
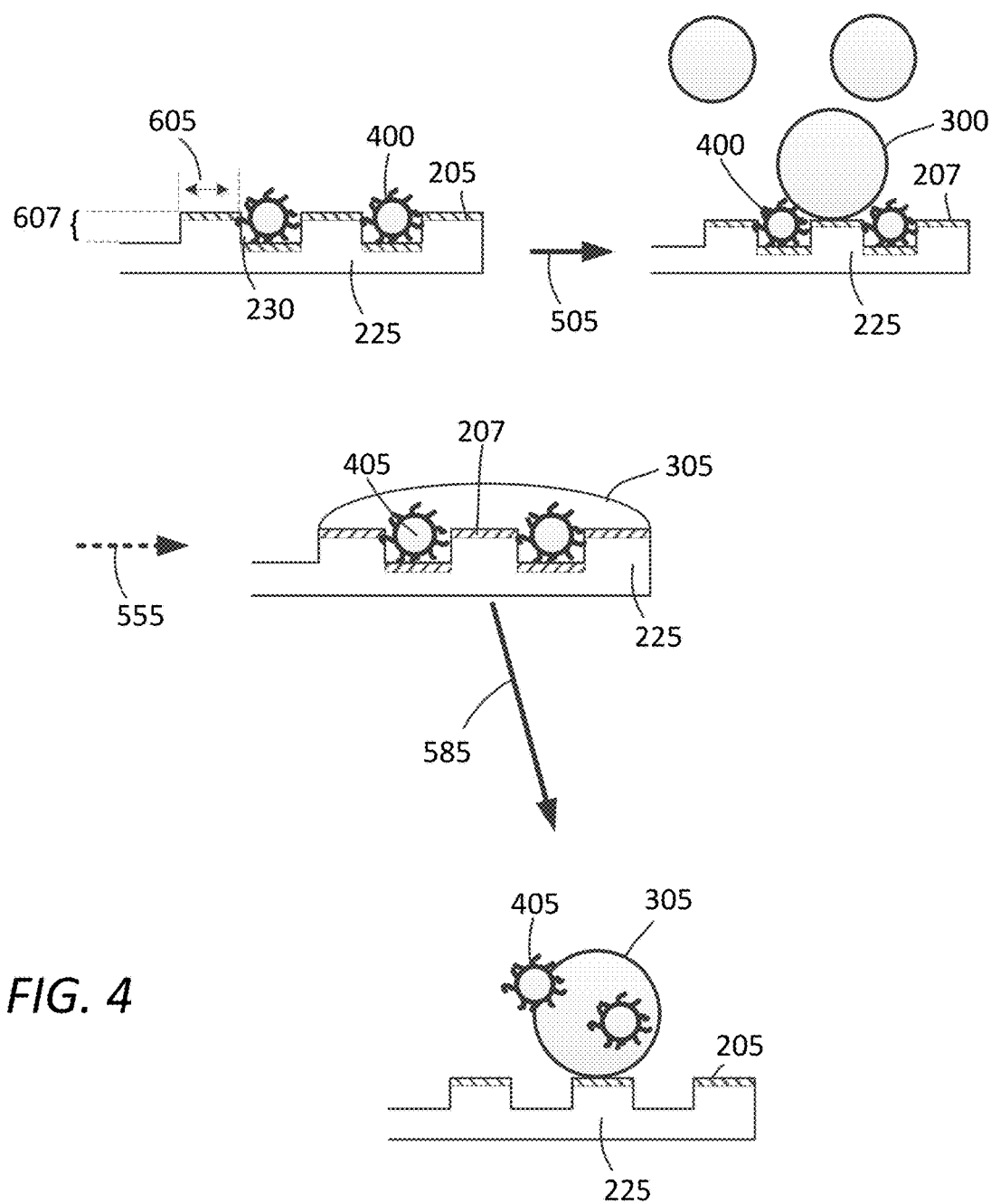
FIG. 4 depicts an alternate exemplary embodiment of the materials and methods disclosed herein for decontamination of a surface.

FIG. 4 presents an alternate embodiment of the methods described herein, whereby surface of substrate is configured with asperities having a length 605 along the longitudinal axis of the surface, and having a height 607 perpendicular to the longitudinal axis of the surface of substrate 225. Contaminant 400 may be present in crevices or cracks 230 in the surface of substrate 205. Decontaminating agents 300 are presented to substrate to 225 after adjustment of surface 205 to the second hydrophilic (or hydrophobic) surface state, depicted as surface 207. Decontaminating agents 305 wets the surface 207, which may deactivate or chemically alter contaminant 405. Adjustment of the second hydrophilic surface state 207 back to first hydrophobic (or hydrophilic) surface state (e.g., by removing stimulus as depicted by arrow 585) presents decontaminating agent 305 and deactivated contaminant 405 for removal.

Figure 5:
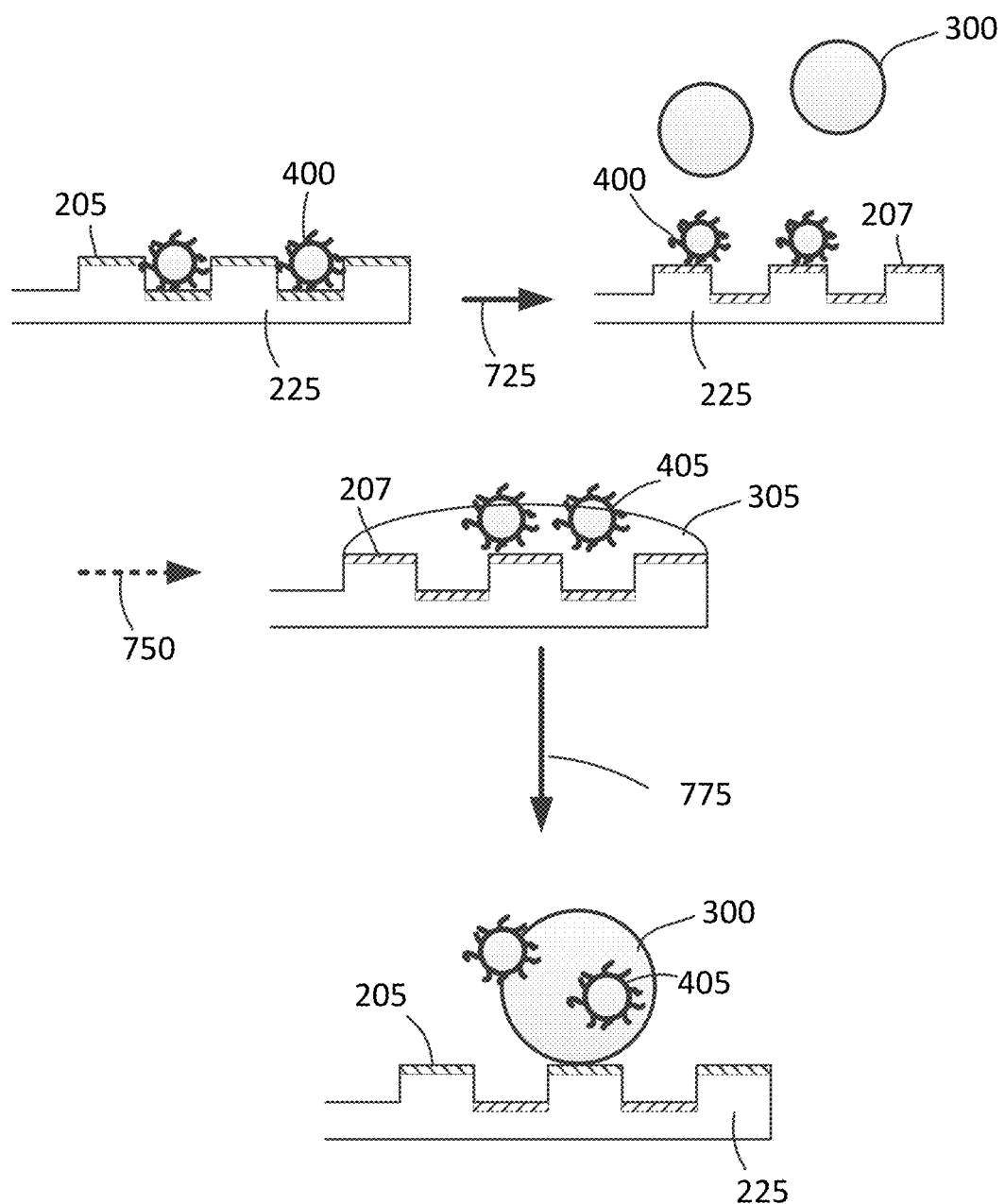
FIG. 5 depicts another exemplary embodiment of the materials and methods disclosed herein for decontamination of a surface.

FIG. 5 depicts an alternative method herein disclosed similar to that as depicted in FIG. 4 except that adjustment or transition state, as depicted by arrow 725, is performed prior to introduction of the decontaminating agent 300. Thus, in this aspect, contaminant 400 is more efficiently presented to decontaminating agent 300 on second hydrophilic (or hydrophobic) surface state depicted by surface 207. Wetting of decontaminating agent 305 on surface 207 facilitates removal of deactivated contaminant 405 as shown by dotted arrow 750.

Figure 6:
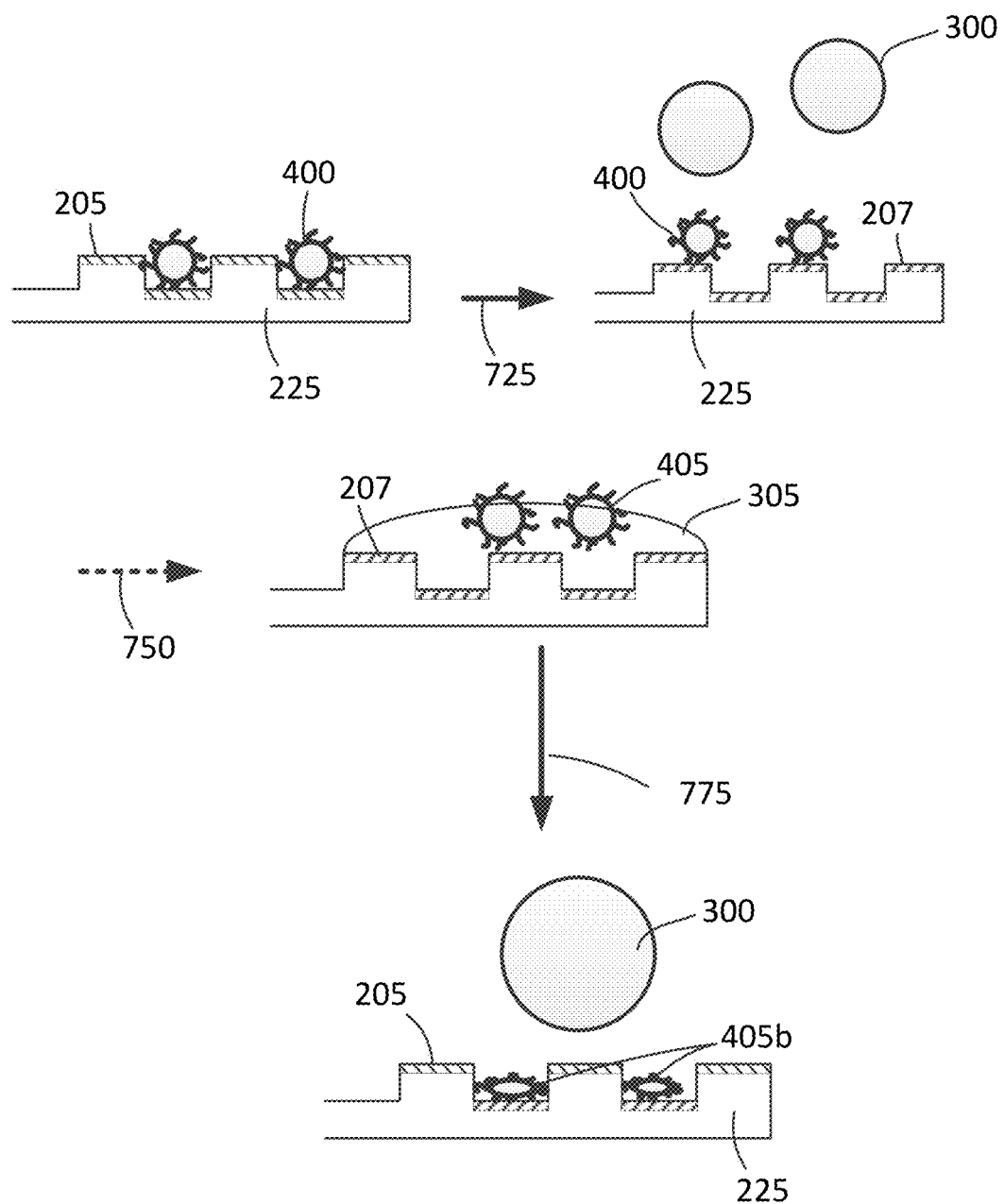
FIG. 6 depicts another exemplary embodiment of the materials and methods disclosed herein for decontamination of a surface.

FIG. 6 depicts an alternate method herein disclosed similar to that of FIG. 5 (that can alternatively be that of FIG. 4), but for deactivated contaminate 405b remaining on the surface of the substrate after reversal to the first surface state. Decontaminating agent 300 can be removed or left on surface 205 e.g., left to evaporate or sublime and/or be physically removed alone or in combination with contaminate 405 or 405b.

As discussed above, reversible hydrophobic/hydrophilic surfaces can be illuminated with a UV light. A UV light unit may be a hand-held, pulsed UV lamp system, such as a short-arc-bulb flashlamp array. The UV light unit can be placed in close proximity to the surface to facilitate the adjustment of the surface from the first surface state to the second surface state. The adjustable surface when in the second hydrophilic surface state can be contacted with one or more decontaminating agents. In one aspect, the decontaminating agent when contacting the second hydrophilic surface state effectively removes substantially all of the contamination. In other aspect, the UV light, alone or in combination with the second hydrophilic surface state and decontaminating agent and/or sensitizers, surfactants, etc., can deactivate the contaminate. Exposures of less than 105 J/m$^2$ can effect several orders of magnitude deactivation of most pathogens.

In one aspect, a mobile system is used to provide the UV light and/or thermal energy to facilitate the surface adjustment of the substrate to be decontaminated. The mobile unit can be configured for deployment in an aerospace vehicle, for example, a unit having a UV light intensity of about 1 to 1000 mW/cm$^2$ or IR heat. The light source can be continuous or pulsed. The mobile system can further comprise a spraying system for dispensing the decontaminating agents. The sprayer system and the UV or IR light system can be operated remotely, or manually operated, for example by personnel wearing protective clothing, protective eyeglasses, goggles, masks and/or respirator apparatus as may be necessary. Furthermore, the personnel can be provided with, and garments to avoid damage to their eyes or skin by prolonged exposure to UV light.

Typically, the time required for decontamination is proportional to the amount of contaminating substance present. The decontamination time is also a function of the time required for the first hydrophobic surface state to adjust to the second hydrophilic surface state, decontaminating agent and/or the specific stimulus (e.g., wavelength of UV light applied, and the flux intensity of light) used and applied.

The methods and apparatus of the present invention can be used in emergency and military applications to decontaminate vehicles, clothed and unclothed persons, tools and implements, and airborne clouds created by chemical and biological weapons, and industrial accidents.

From the foregoing description, various modifications and changes in the compositions and method will occur to those skilled in the art without varying from the scope of the invention as defined in the following claims.

What is claimed is:

1. A method comprising:
    applying an external stimulus to a surface of a substrate;
    adjusting at least a portion of the surface from a first state to a second state, wherein either (i) the first state presents a substantially hydrophobic surface and the second state presents a substantially hydrophilic surface; or (ii) the first state presents a substantially hydrophilic surface and second state presents a substantially hydrophobic surface;
    contacting the surface in the second state with a fluid or gas, the fluid or gas having one or more decontaminating agents effective on one or more contaminates associated with the surface of the substrate;
    removing the external stimulus to the surface of the substrate, the surface transforming from the second state back to the first state, whereby at least a portion of the surface of the substrate is decontaminated.

2. The method of claim 1, further comprising removing at least a portion of the decontaminating agent from the surface.

3. The method of claim 1, wherein the stimulus is electrical, light, chemical, mechanical, or combinations thereof.

4. The method of claim 1, wherein by the decontaminating agent substantial wets the hydrophilic surface.

5. The method of claim 1, wherein the hydrophobic surface is superhydrophobic.

6. The method of claim 1, wherein the hydrophilic surface is superhydrophilic.

7. The method of claim 1, wherein the hydrophilic surface facilitates liquid film formation of the one or more decontaminating agents.

8. The method of claim 1, further comprising removing at least a portion of the one or more contaminates.

9. The method of claim 1, wherein the substrate is at least an interior surface of a vehicle or the exterior surface of equipment.

10. The method of claim 1, wherein the substrate is at least an interior surface of an aerospace vehicle.

11. A method for decontaminating a surface, the method comprising:
    providing a contaminated surface, the contaminated surface having a first surface state and a second surface state, wherein the first surface state and the second surface state are reversible by application of an external stimulus, wherein either (i) the first surface state presents a substantially hydrophobic surface and the second surface state presents a substantially hydrophilic surface; or (ii) the first surface state presents a substantially hydrophilic surface and second surface state presents a substantially hydrophobic surface;
    introducing a decontaminating agent to the contaminated surface; and
    adjusting at least a portion of the first surface state to the second surface state, wherein the decontaminating agent wets at least a portion of the surface.

12. The method of claim 11, further comprising discontinuing the external stimulus, wherein at least a portion of the second surface state is reversed back to the first surface state.

13. The method of claim 11, wherein the second surface state facilitates wetting of at least a portion of the surface layer by the decontaminating agent.

14. The method of claim 11, wherein the wetting of the surface layer facilitates decontamination of the surface.

15. The method of claim 11, wherein the surface comprises semiconductor oxides or chemically modified polymer.

16. The method of claim 11, wherein at least a portion of the hydrophobic surface state is a superhydrophobic surface.

17. The method of claim 11, wherein at least a portion of the hydrophilic surface state is a superhydrophilic surface.

18. The method of claim 11, further comprising removing at least a portion of the contamination from the contaminated surface.

* * * * *

UNITED STATES PATENT AND TRADEMARK OFFICE
CERTIFICATE OF CORRECTION

PATENT NO. : 9,579,698 B2
APPLICATION NO. : 15/099949
DATED : February 28, 2017
INVENTOR(S) : Leora Peltz It is certified that error appears in the above-identified patent and that said Letters Patent is hereby corrected as shown below:

On the Title Page

Item (54):
Please change the Title to:
SURFACE MATERIALS FOR DECONTAMINATION WITH DECONTAMINANTS Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*